(12) United States Patent
Lohrentz

(10) Patent No.: US 7,937,921 B2
(45) Date of Patent: May 10, 2011

(54) BREAK-AWAY FINGER FOR RETRACTING FINGER AUGER

(75) Inventor: Randy Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 456 days.

(21) Appl. No.: 12/041,493

(22) Filed: Mar. 3, 2008

(65) Prior Publication Data

US 2009/0217639 A1      Sep. 3, 2009

(51) Int. Cl.
*A01D 34/52*      (2006.01)

(52) U.S. Cl. .................................. 56/294; 56/364

(58) Field of Classification Search ............ 56/294, 56/364, 400, 12.4, 330, 400.21; 172/21, 172/22; 198/613, 693, 722
See application file for complete search history.

(56) References Cited

U.S. PATENT DOCUMENTS

| | | |
|---|---|---|
| 2,309,238 A | 1/1943 | Corey |
| 2,696,290 A | 4/1950 | Carroll |
| 2,701,634 A | 2/1955 | Carroll |
| 2,849,103 A | 8/1958 | Scheffter et al. |
| 3,126,693 A * | 3/1964 | Renn ............................ 56/364 |
| 3,175,347 A * | 3/1965 | Scheidenhelm ............... 56/400 |
| 3,439,947 A | 4/1969 | Luckenbill et al. |
| 4,145,866 A | 3/1979 | Zweegers |
| 4,271,956 A | 6/1981 | Hutchinson et al. |
| 4,409,781 A | 10/1983 | Blackstone |
| 4,610,432 A | 9/1986 | Lewis et al. |
| 4,901,511 A | 2/1990 | Yarmashev et al. |
| 5,285,622 A * | 2/1994 | Klinner ......................... 56/130 |
| 5,484,217 A * | 1/1996 | Carroll et al. .................... 403/2 |
| 5,884,432 A * | 3/1999 | DeLillo ........................... 49/49 |
| 5,946,896 A * | 9/1999 | Daniels ...................... 56/328.1 |
| 6,042,292 A * | 3/2000 | Belanger et al. ................. 403/2 |
| 6,158,571 A * | 12/2000 | Gosa .............................. 198/613 |
| 6,199,357 B1 * | 3/2001 | Bloom ........................... 56/220 |
| 6,467,246 B1 * | 10/2002 | McCredie ...................... 56/296 |
| 6,668,534 B2 | 12/2003 | Sheedy et al. |
| 7,401,457 B2 | 7/2008 | Bich et al. |
| 7,669,396 B2 * | 3/2010 | Eagles et al. ................... 56/153 |

* cited by examiner

*Primary Examiner* — Douglas A Hess

(57) ABSTRACT

A tubular metal finger for a retracting finger auger assembly has a mounting portion adjacent the normally inner end of the finger, a working portion adjacent the opposite, normally outer end of the finger, and a weakened break-away portion between the mounting and working portions. Weakening of the sidewall of the tube in the break-away portion is accomplished through the provision of a pair of diametrically opposed, circular holes through the tube.

7 Claims, 6 Drawing Sheets

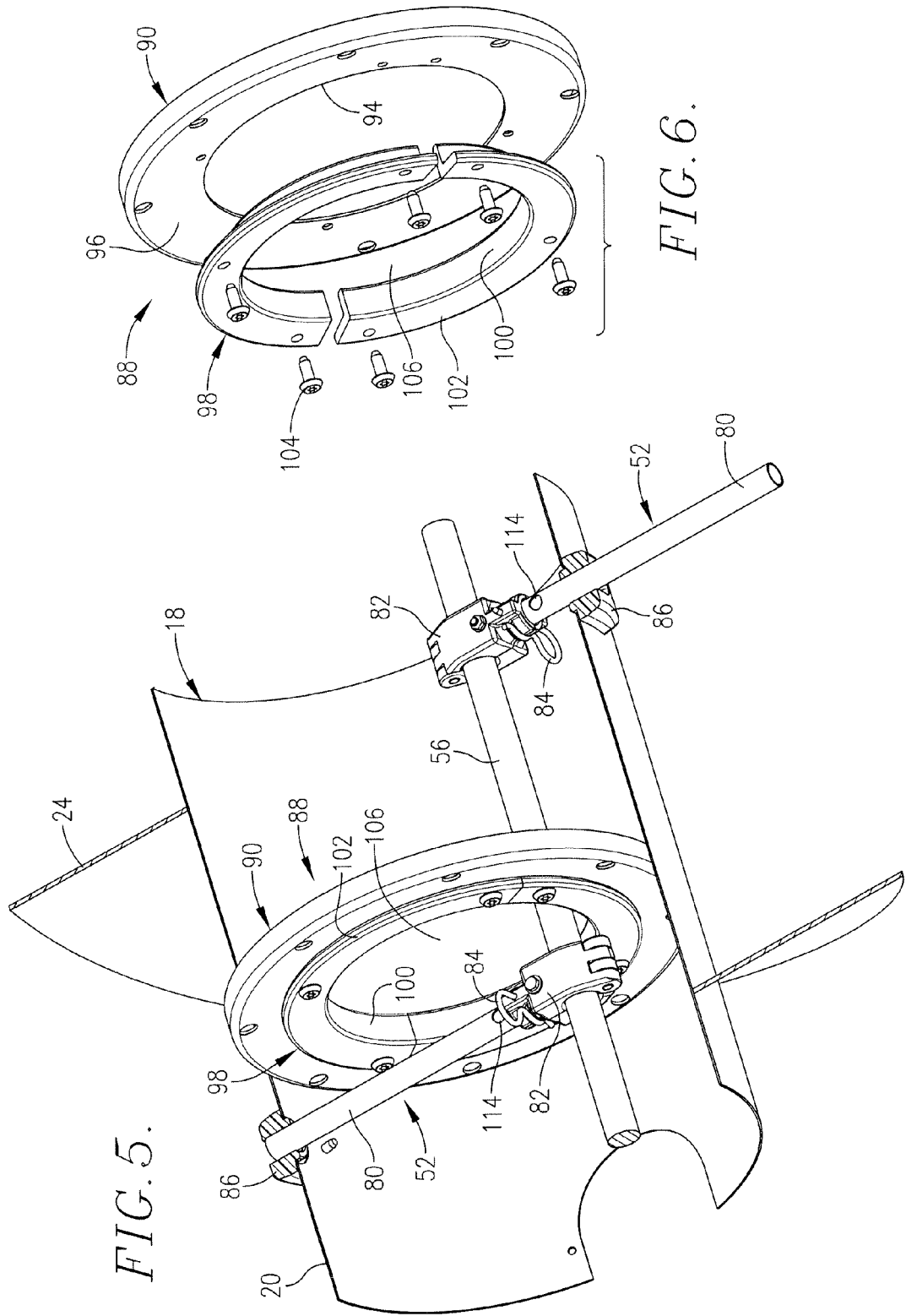

US 7,937,921 B2

BREAK-AWAY FINGER FOR RETRACTING FINGER AUGER

TECHNICAL FIELD

The present invention relates to retracting finger auger assemblies utilized in grain harvesting headers and the like and, more particularly, to a break-away finger for such assemblies that is designed to reliably break off at a specific, predetermined failure point when untoward loading is encountered rather than bend or break at some random location.

BACKGROUND AND SUMMARY

Retracting finger auger assemblies are well known in the art and have been used for many years to converge crop materials centrally and then feed them rearwardly. Typically, the auger assembly is set up such that the fingers extend as they engage crop material at the front of the auger and retract as they release material at the back.

A typical retracting finger auger assembly has a stationary crank shaft within the auger tube and fingers that are pivotally mounted on an eccentrically offset finger shaft portion of the crank shaft. The auger tube rotates while the crank shaft remains stationary, but because the fingers project outwardly through holes in the auger tube, they are driven around the finger shaft by the auger tube as it rotates. Because the auger tube rotates about one axis while the fingers pivot about the axis of the offset finger shaft, the fingers extend and retract through the holes in the auger tube as they revolve about the finger shaft.

It is known in the art to make such fingers out of a relatively light, tubular steel alloy that is intended to break in the event of untoward loading on the finger such as when striking a rock or other obstruction in the field. However, such tubular fingers tend to break at random locations along their length, or simply bend instead of break off completely and cleanly. Either of such conditions can result in serious damage to the auger tube or the operating mechanism within the auger tube.

Accordingly, it is a goal of the present invention to provide a tubular metal finger that can be relied upon to invariably break off cleanly and completely at a certain, predetermined failure point on the finger when untoward loading is encountered by the finger.

BRIEF DESCRIPTION OF THE DRAWINGS

FIG. 5 is an enlarged, fragmentary isometric view of the auger assembly illustrating the relationship between a flex limiter and a finger shaft of the assembly;

FIG. 6 is an exploded isometric view of a flex limiter illustrating details of construction;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
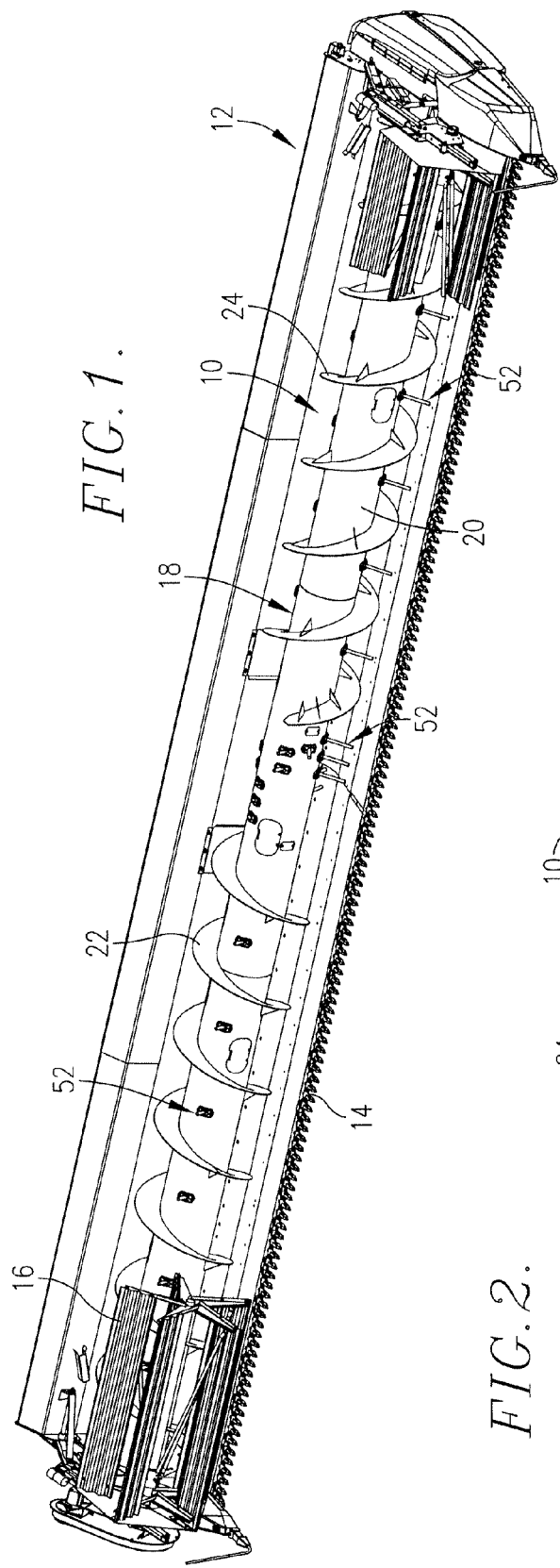
FIG. 1 is a left front isometric view of a harvesting header utilizing a retracting finger auger assembly in accordance with the principles of the present invention, portions of the harvesting reel being broken away to reveal details of construction of the auger assembly.

In FIG. 1a retracting finger auger assembly 10 utilizing break-away fingers in accordance with the present invention is shown as part of a grain harvesting header 12 having a sickle 14 for severing standing crop materials from the ground. A rotary reel 16 assists in such severance and helps feed the severed materials rearwardly to auger assembly 10. It will be appreciated, however, that the principles of the present invention are not limited to the particular header 12 selected for illustration and that such principles can be used in a variety of different header constructions and auger assemblies.

In the illustrated embodiment, auger assembly 10 extends substantially the entire width of header 12 and includes a long auger tube 18 having a cylindrical sidewall 20. Oppositely inclined auger flighting 22 and 24 on opposite left and right halves of the tube 20 are disposed to converge cut crop centrally of header 12 for subsequent discharge rearwardly therefrom into a feeder house 26 or the like (FIG. 4) of a combine harvester (not shown) to which header 12 is attached.

Figure 2:
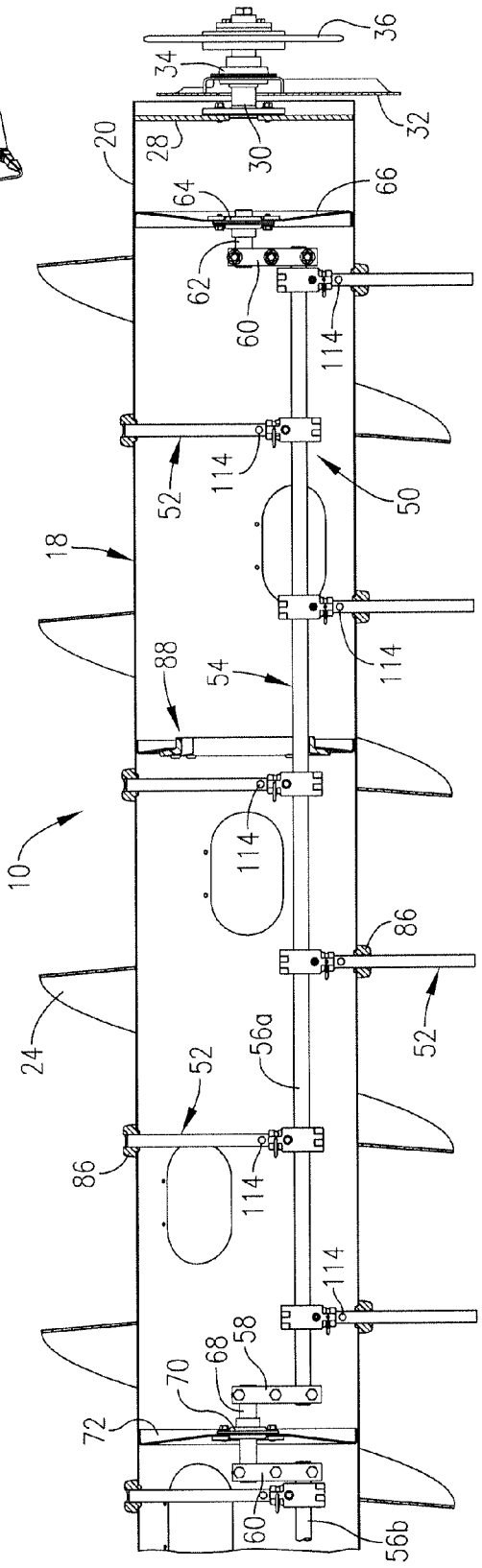
FIG. 2 is an enlarged, fragmentary, longitudinal cross sectional view through the left end of the auger assembly illustrating internal details of construction.

Auger tube 18 is supported at its opposite ends for driven rotation about the longitudinal axis of tube 18. In this respect, the left end of auger tube 18 as illustrated in FIG. 2 has an end panel 28 fixed to sidewall 20, the end panel 28 in turn having a stub shaft 30 fixed axially thereto and projecting outwardly therefrom. Stub shaft 30 is rotatably supported by a bracket 32 on the header and a bearing assembly 34, and a sprocket 36 is attached to the outer end of stub shaft 30 for receiving driving power from a chain drive (not shown) and utilizing such input to rotate tube 18.

Figure 3:
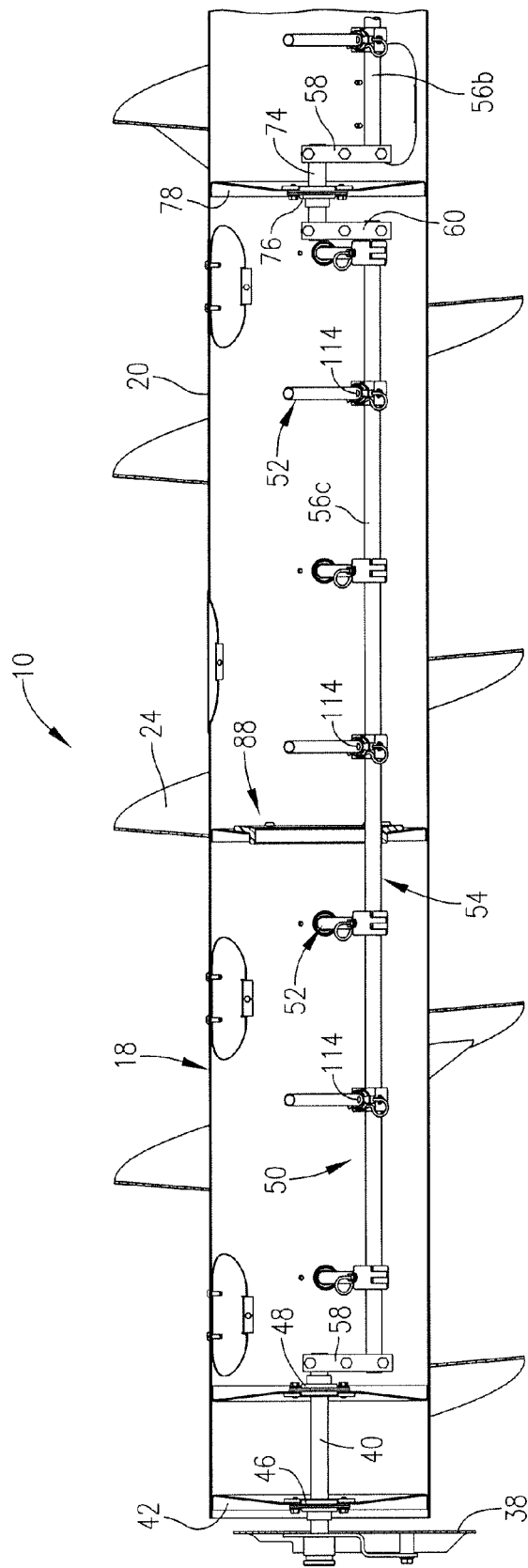
FIG. 3 is a similarly enlarged, fragmentary longitudinal cross sectional view of the opposite, right end of the auger assembly.

At the opposite, right end of auger tube 18 as illustrated in FIG. 3, a bracket 38 on the header carries a normally stationary stub shaft 40 that projects from bracket 38 into the end of auger tube 18 coaxially with the longitudinal axis of tube 18 and stub shaft 30. A pair of axially spaced bulkheads 42 and 44 within the right end of auger tube 18 are provided with bearing assemblies 46 and 48 respectively for the purpose of rotatably supporting auger tube 18 on stationary stub shaft 40. Thus, the right end of auger tube 18 is rotatably supported on stub shaft 40, which remains stationary, while the left end of auger tube 18 rotates with stub shaft 30 which, in turn, is driven by sprocket 36.

Auger assembly 10 further includes a retracting finger mechanism 50 that broadly includes two primary components, i.e., a set of retracting break-away fingers 52 and a stationary crank shaft 54 that carries fingers 52. In the illustrated embodiment, fingers 52 are located generally along the full length of auger tube 18, although it is to be appreciated that the principles of the present invention are not limited to this arrangement. For example, it is possible that fingers 52 might be provided only in the central region of auger tube 18, leaving the two flighted portions thereof essentially finger-free. In any event, in the illustrated embodiment, crank shaft 54 is full length of auger tube 18 and is divided into three sections, comprising a right section, a central section and a left section.

Each such section of crank shaft 54 includes a laterally offset shaft portion comprising a finger shaft 56 that extends parallel to the axis of rotation of auger tube 18 in eccentric relationship therewith. Opposite ends of each offset finger shaft 56 are provided with cranks 58 and 60 that are in turn fixed to portions of crank shaft 54 that are coaxial with the axis of rotation of auger tube 18.

Starting with the left end of left finger shaft 56a as illustrated in FIG. 2, it will be seen that crank 60 is fixed to a stub shaft 62 journaled by a bearing assembly 64 in a support bulkhead 66 that is fixed to sidewall 20 of auger tube 18. At the opposite end of finger shaft 56a in FIG. 2, crank 58 is fixed to a stub shaft 68 that is journaled by a bearing assembly 70 carried by a support bulkhead 72 fixed to sidewall 20. Stub shaft 68 projects axially through support bulkhead 72 into the central area of auger tube 18 and at that location is fixed to the crank 60 associated with the central finger shaft 56b. As shown in FIG. 3, the central finger shaft 56b at its right end has its crank 58 fixed to a stub shaft 74 that is journaled by a bearing assembly 76 in a support bulk head 78 fixed to sidewall 20. After passing through bulkhead 78, stub shaft 74 fixedly connects to crank 60 associated with the right finger shaft 56c, which is fixed at its outboard end to its other crank 58. Crank 58 of right finger shaft 56c is in turn fixed to stub shaft 40 projecting inwardly from header support structure 38.

Each of the fingers 52 is pivotally mounted on its finger shaft 56 for rotation about the axis of finger shaft 56. Each finger 52 preferably comprises a metal finger tube 80 that is replaceably received within a plastic holder 82 rotatably carried on finger shaft 56. A cotter pin 84 or the like may be used to releasably retain each finger tube 80 within its corresponding holder 82.

The outer end of each finger tube 80 projects through and is slidably received by a guide 86 fixedly secured within a mounting hole in the sidewall 20 of auger tube 18. In the left and right portions of auger tube 18, finger guides 86 are disposed at diametrically opposed and axially spaced positions along auger tube 18, while in the central portion of auger tube 18, finger guides 86 are preferably arranged in side-by-side groups of two or three at suitable intervals about tube 18.

Figure 4:
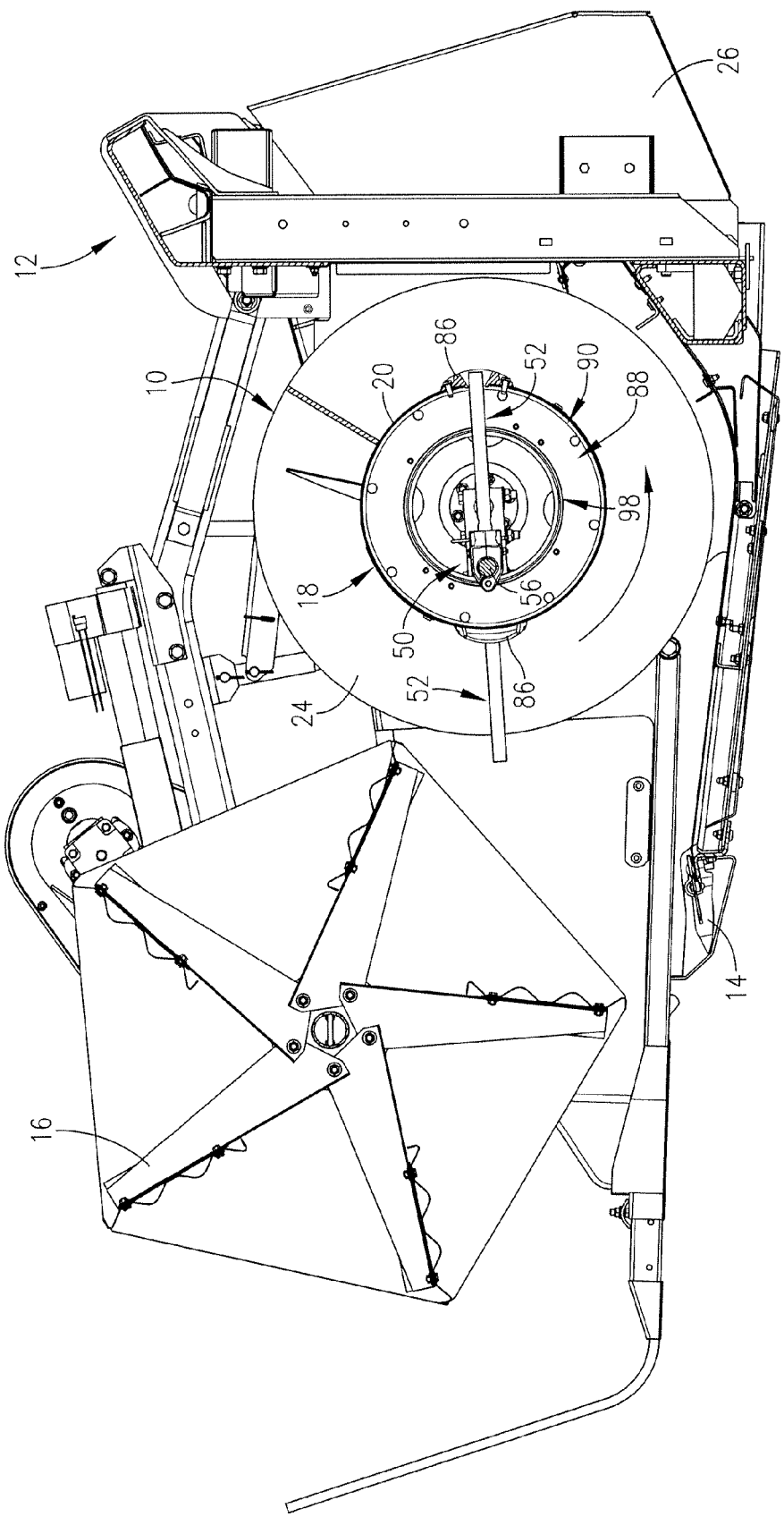
FIG. 4 is a transverse, vertical cross sectional view through the left end of the header just inboard of the drive mechanism on the header revealing internal details of construction of the auger assembly.

As a result of this construction, when auger tube 18 is rotated by drive sheave 36 in a counterclockwise direction viewing FIG. 4, crank shaft 54 remains stationary but fingers 52 are driven about their finger shafts 56 by the rotating tube 18. Due to the offset relationship between finger shafts 56 and the axis of rotation of auger tube 18, fingers 52 sequentially extend and retract during each complete revolution. Because auger tube 18 rotates in a counterclockwise direction viewing FIG. 4 and the finger shafts 56 are offset toward the front, fingers 52 are caused extend forwardly along the front of auger tube 18 and to retract along the backside thereof. At other locations between these two extremes, the fingers are either being retracted (as they move down and under the auger tube) or extended (as they move up and over the auger tube).

It will be appreciated that, particularly in the left and right sections of the auger tube 18, finger shafts 56 are quite lengthy compared to the diameter of such shafts. Therefore, there is a tendency for finger shafts 56 to bounce and flex during rotation of auger assembly 10. Such action is particularly likely to occur when some of the fingers 52 encounter unanticipated loads. For example, when fingers 52 are fully extended on the front side of auger tube 18, the outboard portions of fingers 52 have significant mechanical advantage over the inboard portions thereof. Thus, a load experienced by the exterior portion of the finger can cause the finger to fulcrum about the finger guide 86 and flex the finger shaft 56 in a way that may seek to retract fingers 52 on the opposite side of auger 18 more than their intended amount. If one of the fingers 52 becomes retracted so far that it is pulled back inside auger tube 18, it can punch a hole in the auger tube as it attempts to extend during the extension phase of the finger, or cause catastrophic failure of the mechanism.

Each of the left and right finger shafts 56a and 56b is provided with at least one flex limiter 88 between the supporting bulkheads for the finger shaft. Each flex limiter 88 includes a transverse, annular, metallic member 90 having a circular periphery 92 that is welded or otherwise permanently affixed to the interior surface of sidewall 20 approximately mid-length of the finger shaft 56a or 56c. Annular member 90 extends at right angles to the longitudinal axis of auger tube 18 and has a centrally located, enlarged circular opening 94 through which the finger shaft 56a or 56c passes. Opening 94 is concentrically disposed with respect to the axis of rotation of auger tube 18. A front face 96 of member 90 slopes gradually in the axial direction as opening 94 is approached.

Figure 7:
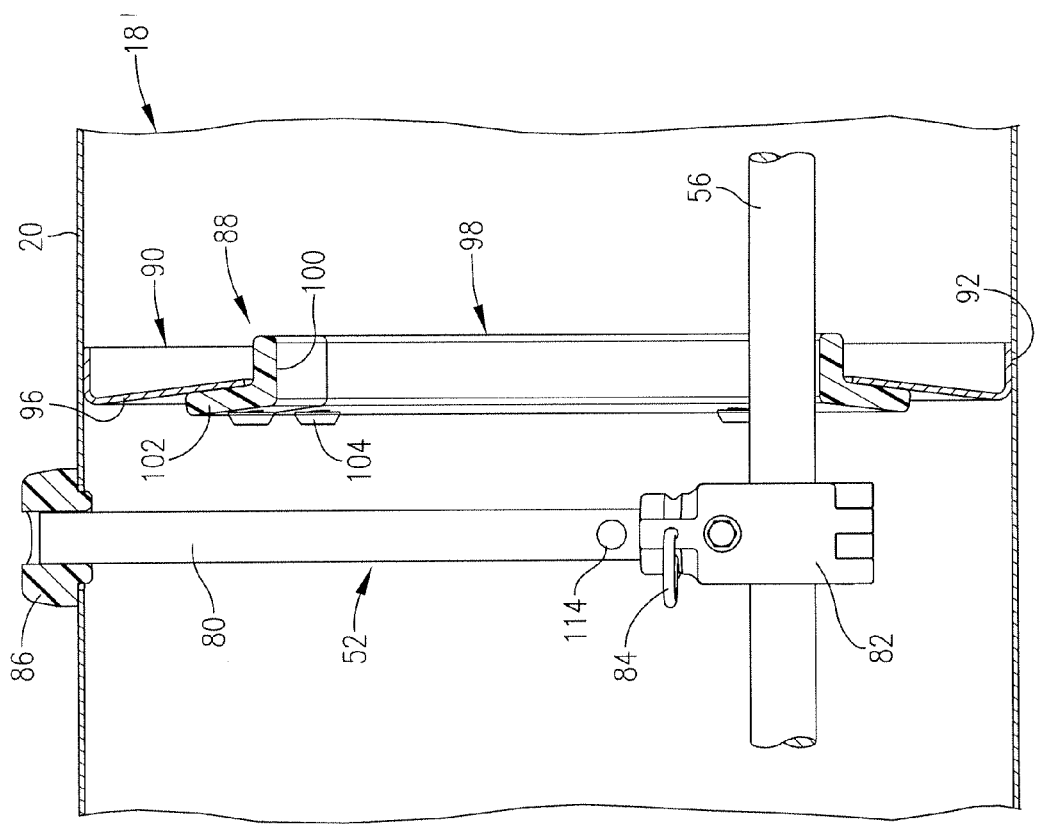
FIG. 7 is an enlarged, fragmentary longitudinal cross-sectional view through the auger assembly illustrating one of the break-away holes of a finger of the assembly.
Figure 9:
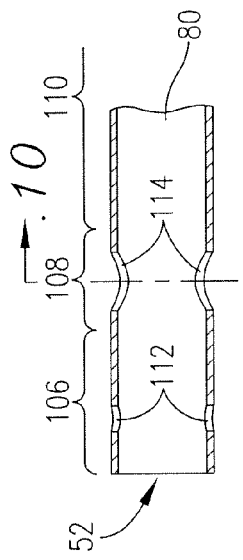
FIG. 9 is a fragmentary longitudinal cross-sectional view of the finger illustrating in particular the mounting and break-away portions of the finger.
Figure 8:
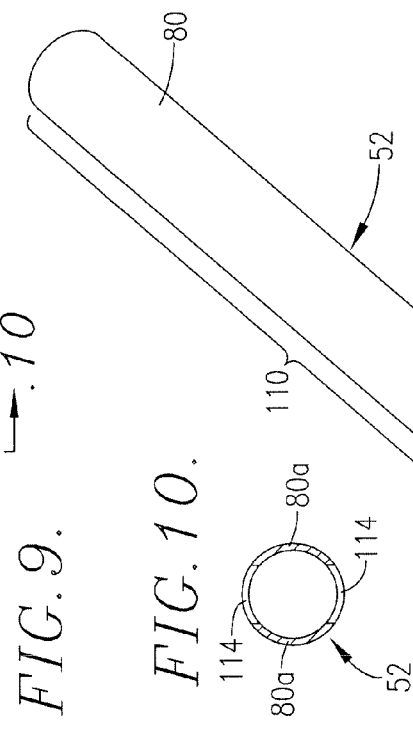
FIG. 8 is an enlarged isometric view of a break-away finger in accordance with the present invention.

Flex limiter 88 further includes an anti-friction guide ring 98 disposed concentrically within annular member 90 and securely fastened thereto. In one preferred form, guide ring 98 is constructed from ultra high molecular weight (UHMW) polyethylene, although other materials may also be utilized. Guide ring 98 circumscribes the corresponding finger shaft 56a, 56b and has a radially inner surface 100 that is normally slightly spaced radially outwardly from the outer extremity of finger shaft 56 so that surface 100 does not normally contact finger shaft 56 during rotation of auger tube 18. However, in the event of slight outward flexing of finger shaft 56, surface 100 comes into engagement with shaft 56 and prevents further flexing thereof, thereby also preventing further retraction of those fingers 52 that are already fully retracted to the extent illustrated in FIGS. 5 and 7, for example. Longer than momentary engagement of finger shaft 56 with surface 100 can be accommodated, if necessary, due to the anti-friction nature of the material from which guide ring 98 is constructed. Inner surface 100 defines a circular hole 106 that is concentric with opening 94 and has a slightly smaller diameter.

Guide ring 98 also has a circumferential, radially outwardly extending lip 102 integral with surface 100 and overlying a portion of the front face 96 of transverse member 90. Lip 102 serves as the means by which guide ring 98 is secured to annular member 90, having a plurality of suitable fasteners 104 that project through lip 102 and into retaining engagement with member 90. In one preferred form, fasteners 104 may take the form of machines screws. Preferably, guide ring 98 is formed from two semi-circular halves, as shown particularly in FIG. 6.

It will be noted that each flex limiter 88 does not interfere with rotation of auger tube 18 or extension and retraction of fingers 52. In normal operating conditions, limiters 88 do not make engagement with their finger shafts 56a, 56c. However, in the event that any of the fingers 52 experiences unusual loading such as would normally cause a shaft 56a or 56c to flex, the corresponding limiter 88 is well positioned to engage the slightly flexed shaft before it can move to such an extent that damage or catastrophic failure can occur.

Figure 10:
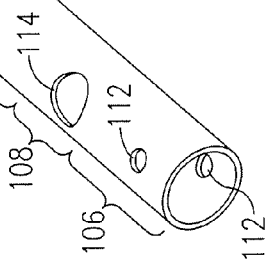
FIG. 10 is a transverse cross-sectional view through the finger taken substantially along line 10-10 of FIG. 9.
Figure 11:
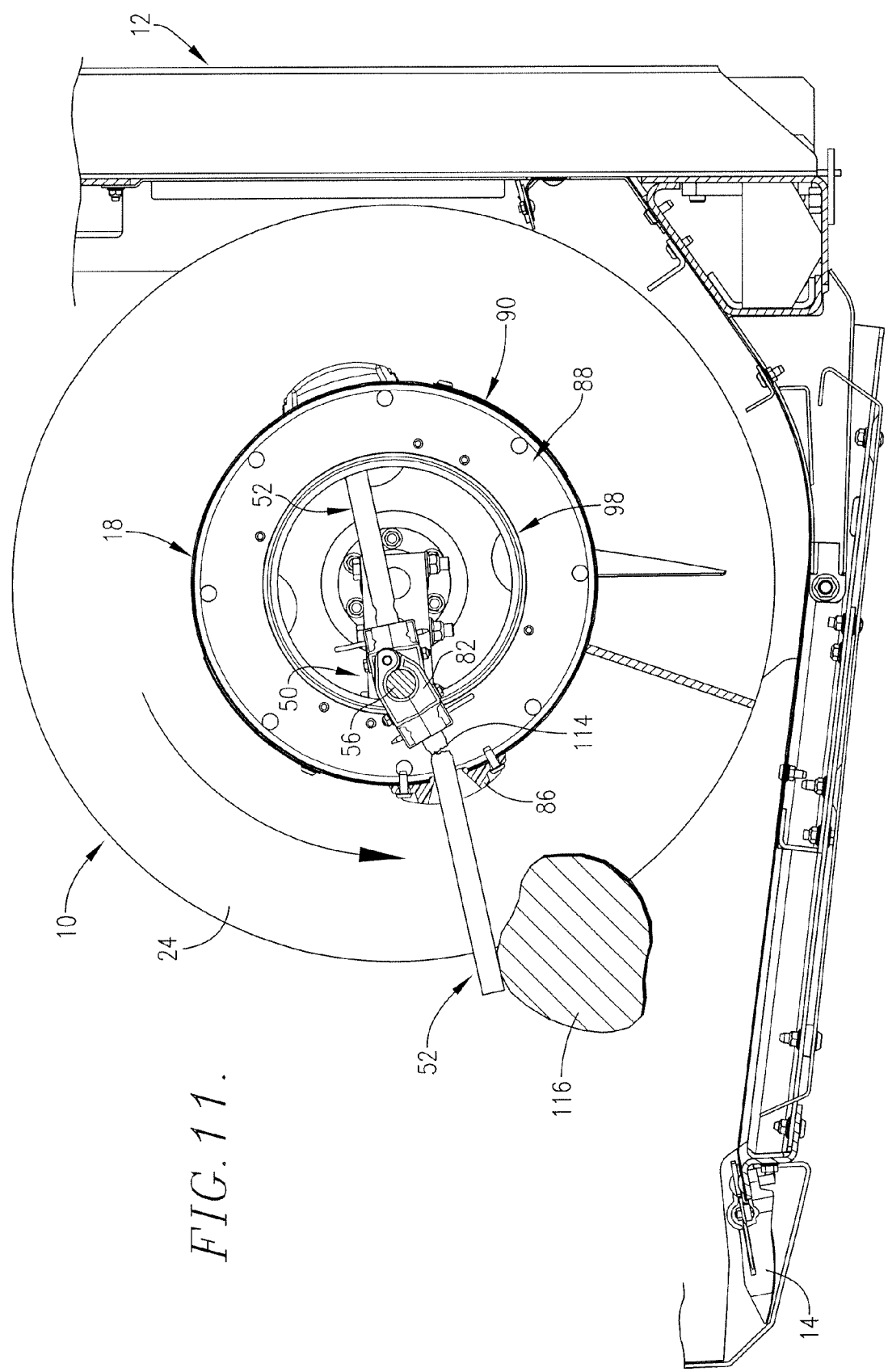
FIG. 11 is a fragmentary vertical cross-sectional view through the header illustrating how the finger in accordance with the present invention breaks away when encountering an untoward impact load from a rock or other obstruction.

With particular reference to FIGS. 7-11, the finger tube 80 of each finger 52 has a mounting portion 106 adjacent the normally inboard end of the tube, a break-away portion 108 immediately outboard of mounting portion 106, and a working portion 110 extending from the termination of break-away portion 108 to the normally outboard end of tube 80. Within mounting portion 106, a pair of diametrically opposed, circular, small diameter mounting holes 112 are provided in opposite sides of the tube for receiving the retaining pin 84 that removably secures finger 52 within plastic holder 82. Within break-away portion 108, a pair of larger, diametrically opposed, circular break-away holes 114 are provided in opposite sides of the tube to weaken the sidewall of tube in that region and thereby predetermine the location at which fracture will occur when the finger is subjected to untoward loading as illustrated in FIG. 11 where finger 52 is shown impacting a stone 116.

It will be noted that break-away holes 114 are positioned on tube 80 in such a manner that their common axis is disposed in parallel relationship with the common axis of mounting holes 112. Both axes are transverse to the axis of rotation of the auger. Thus, in a preferred form of the invention, the weakest sections of the sidewall of tube 80, i.e., the sections that are missing material due to the break-away holes 114, are positioned to bear the brunt of the loading from obstructions such as stone 114 and thereby help assure complete and clean fracture of the finger, instead of the finger merely bending at the break-away holes. As illustrated in FIG. 10, in a preferred form, each of the opposed arcuate sidewall sections 80a between break-away holes 114 is generally the same arcuate length as the arcuate length of the void in the sidewall defined by one of the break-away holes 114. Thus, in the critical break-away portion 108 the tube cross-section has generally equal amounts of solid material and void space.

While it is possible that the weakness-creating voids in break-away region 108 could be provided by circumferentially extending slits in the sidewall of tube 80, circular holes have been found to be preferable and easier to produce. In one exemplary commercial form of the invention the fingers 52 are constructed from 4130 steel alloy tubes drawn over a mandrel and austempered to a Rockwell hardness of 40-48 on the C scale. Such tubes have an outer diameter of 0.875 inches, a wall thickness of 0.058 inches, and an overall length of 11.417 inches. Break-away holes 114 are each 0.5000-0.5106 inches in diameter, while mounting holes 112 are each 0.2189-0.2259 inches in diameter.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A break-away auger finger comprising:
   an elongated metal tube having a circular transverse cross-section defined by a continuous cylindrical sidewall of the tube,
   said tube having a mounting portion adjacent one end of the tube, a working portion adjacent the opposite end of the tube, and a break-away portion integrally interconnecting the mounting and working portions; and
   a pair of diametrically opposed, circular break-away holes in the sidewall within said break-away portion of the tube for weakening the break-away portion a sufficient extent that the finger will fracture at said break-away portion under a predetermined transverse load applied to the working portion of the tube,
   said finger having a pair of diametrically opposed mounting holes in the sidewall within said mounting portion of the tube,
   said mounting holes being smaller in diameter than said break-away holes.

2. A break-away auger finger as claimed in claim 1,
   said break-away holes having their common axis disposed in parallel relationship with the common axis of the mounting holes.

3. A break-away auger finger as claimed in claim 2,
   both of said break-away holes being of the same diameter.

4. A break-away auger finger as claimed in claim 3,
   said sidewall in the break-away portion having a transverse cross-section in which the arcuate length of void sections presented by said break-away holes is generally equal to the arcuate length of solid sections between the break-away holes.

5. A break-away auger finger as claimed in claim 1,
   both of said break-away holes being of the same diameter.

6. A break-away auger finger as claimed in claim 5,
   said sidewall in the break-away portion having a transverse cross-section in which the arcuate length of void sections presented by said break-away holes is generally equal to the arcuate length of solid sections between the break-away holes.

7. A break-away auger finger as claimed in claim 1,
   said sidewall in the break-away portion having a transverse cross-section in which the arcuate length of void sections presented by said break-away holes is generally equal to the arcuate length of solid sections between the break-away holes.

* * * * *